United States Patent [19]

Mastrangelo

[11] Patent Number: 5,553,927
[45] Date of Patent: Sep. 10, 1996

[54] REAR AXLE ASSEMBLY WITH WHEEL END AXIAL RETENTION

[75] Inventor: Vince Mastrangelo, Ann Arbor, Mich.

[73] Assignee: The Budd Company, Troy, Mich.

[21] Appl. No.: 396,481

[22] Filed: Mar. 2, 1995

[51] Int. Cl.[6] .......................... B60B 35/12; B60B 37/00
[52] U.S. Cl. .................... 301/124.1; 301/105.1; 301/126; 384/544
[58] Field of Search ........................ 301/124.1, 137, 301/125, 126, 131, 132, 105.1, 115; 384/544, 589

[56] References Cited

U.S. PATENT DOCUMENTS

| | | | |
|---|---|---|---|
| 665,497 | 1/1901 | Worth . | |
| 1,259,269 | 3/1918 | Murray . | |
| 1,400,170 | 12/1921 | Kraft | 301/126 |
| 1,812,784 | 6/1931 | Hawley, Jr. . | |
| 1,812,882 | 12/1925 | La Brie . | |
| 1,906,521 | 5/1933 | Boden . | |
| 2,453,635 | 11/1948 | Martin, Jr. | 301/105.1 |
| 2,956,632 | 10/1960 | Forbush et al. . | |
| 3,112,965 | 12/1963 | Popiel | 384/474 |
| 3,915,523 | 10/1975 | Shank | 308/236 |
| 4,331,210 | 5/1982 | Petrak | 180/70 R |
| 4,381,874 | 5/1983 | Strader | 301/125 |
| 4,457,395 | 7/1984 | Ernst et al. . | |
| 4,591,212 | 5/1986 | Balken et al. | 301/105 R |
| 4,613,240 | 9/1986 | Hagelthorn | 384/585 |
| 4,618,159 | 10/1986 | Kozyra et al. | 280/93 |
| 4,764,153 | 8/1988 | Jacob | 464/111 |
| 4,812,094 | 3/1989 | Grube | 411/134 |
| 4,835,829 | 6/1989 | Welschof et al. | 29/159.3 |
| 4,878,683 | 11/1989 | Dever | 280/96.1 |
| 4,881,842 | 11/1989 | Farrell et al. | 403/19 |
| 4,943,171 | 7/1990 | Hofmann et al. | 384/537 |
| 4,986,608 | 1/1991 | Fett | 301/124 R |
| 5,052,828 | 10/1991 | Ciokajlo et al. | 384/476 |
| 5,100,247 | 3/1992 | Woehler | 384/544 |
| 5,129,710 | 7/1992 | Knowles | 301/9 DH |
| 5,159,754 | 11/1992 | Vancsik | 29/898.07 |
| 5,197,786 | 3/1993 | Eschenburg | 301/124.1 |
| 5,259,676 | 11/1993 | Marti | 384/474 |

Primary Examiner—David M. Mitchell
Assistant Examiner—Jonathan J. Yun
Attorney, Agent, or Firm—Leo H. McCormick, Jr.

[57] ABSTRACT

An axle assembly for a motor vehicle of the type including a rigid drive axle and a rigid axle tube extending between a drive axle differential to the axle wheel end. The axle tube features a radial flange defining an outboard facing bearing retention shoulder. A bearing carrier unit is bolted onto the axle tube flange to trap the bearing outer race. The axle shaft engages the bearing inner race which is trapped between a flange on the axle shaft and a nut threaded onto the axle. This wheel and system provides improved wheel run-out characteristics which are advantageous for disk brake applications and facilitates the use of anti-lock braking system wheel speed sensors.

10 Claims, 1 Drawing Sheet

REAR AXLE ASSEMBLY WITH WHEEL END AXIAL RETENTION

BACKGROUND AND SUMMARY OF THE INVENTION

This invention relates to a motor vehicle axle assembly and in particular to a rear axle utilizing a wheel end axial retention system.

In rear wheel drive motor vehicles with rigid rear axles it is conventional practice to provide a pair of solid axle shafts extending from the differential outboard to the rear driven wheels. In such designs, a pair of rigid axle tubes extend outboard from the differential with brake components mounted to the ends of the tubes. The solid axle shafts rotate within the axle tubes. The inboard end of each axle shaft is splined and has a circumferential end groove. The opposite axle shaft end (i.e. the "wheel end") features a wheel mounting flange having wheel mounting studs. At the wheel end the axle shaft is supported by a roller bearings unit positioned at the end of the axle tube. Lubrication of the bearing is provided by axle lubricant present within the axle tube. The outboard bearing restrains the axle radially but does not provide axial or thrust support. The axle shaft is retained axially through a C-washer or snap ring installed in the groove at the inboard end of the axle shaft after the shaft end is passed through a differential bevel gear.

Certain disadvantages are inherent in the above described axle design. This method of axial retention allows a considerable axle shaft end play (i.e. axial "run-out" or motion). This end play can adversely affect the performance of a rear disk brake due to caliper "knock back" and can further produce a noticeable "clunk" in cornering maneuvers as the lateral acceleration forces (i.e. axial axle forces) are reversed. In addition, the axle shaft end play can make discrete mounted rotation speed sensors used in anti-lock braking systems (ABS) difficult to incorporate due to a time-varying air gap between the sensor and the associated rotating tone wheel or exciter.

In addition to performance concerns the above described axle design approach further complicates the process of axle shaft removal since an inspection cover of the differential must typically be removed and the differential lube drained in order to provide access to the axial retention device. Once the retainer is removed the axle can be laterally withdrawn. However, the roller bearing assembly which is typically press fit onto a machined diameter at the axle shaft outboard end must be pressed off after removing a bearing retainer ring (often destroyed in the process).

In accordance with the present invention, a novel approach toward rear axle bearing retention and axial restraint is provided. Through this design, axial end play is significantly reduced providing advantages for rear disk brake applications. In addition, due to a reduced end play, the use of ABS sensors is accommodated. This approach also makes use of new generation unit bearings which are permanently lubricated. And finally, the process of rear axle and bearing disassembly is simplified as compared with current design approaches.

An axle assembly of this invention incorporates a cartridge bearing assembly located at the outboard end of the axle shaft having an outer race which is trapped between the axle tube and a brake caliper bracket/bearing carrier element which is bolted or otherwise fastened to the axle tube. The inner race of the cartridge bearing is trapped between the axle wheel mounting flange at the outboard end of the axle and a threaded nut which meshes with threads formed on the axle shaft. With this system all of the structures which provide lateral restraint for the axle are located at the outboard or wheel end of the axle. Through the use of precision machined surfaces and a threaded nut for clamping the bearing inner race, lateral end play of the axle shaft can be reduced significantly.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE INVENTION

Figure 1:
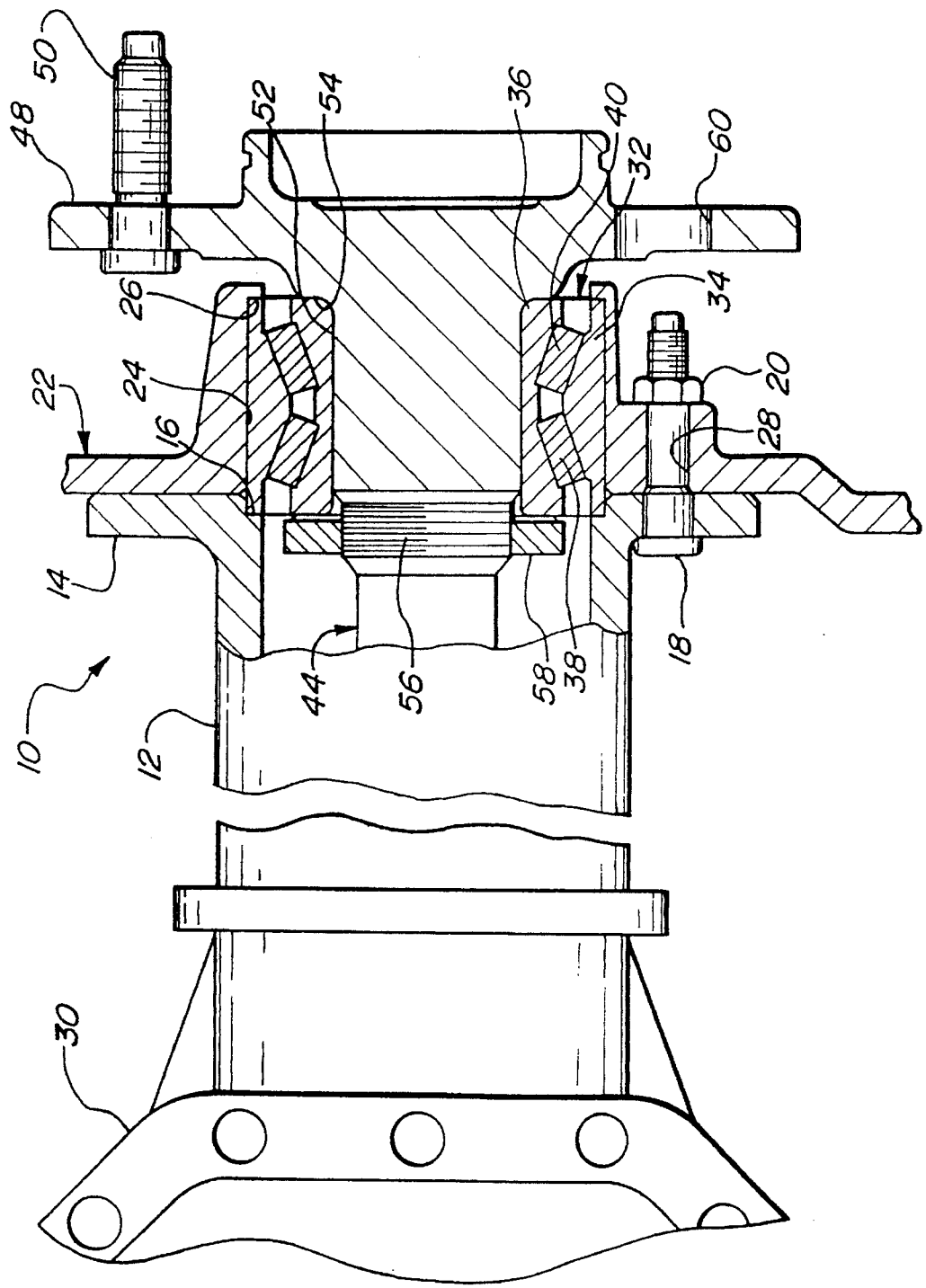
FIG. 1 is a partial rear axle assembly according to this invention showing the wheel end partially in section with inboard component shown in elevation.

A rear axle wheel end assembly according to this invention is shown in an assembled condition in FIG. 1 and is generally designated there by reference number 10. Axle tube 12 is shown partially cut away and is rigidly connected at its inboard end to differential 30. Axle tube flange 14 is formed at the outboard end of axle tube 12. As shown, a shallow counter bore 16 is provided at the outboard end of axle tube 12 which forms an outboard facing bearing assembly retention surface as will be described in more detail below. Axle tube flange 14 further carries a number of bolt fasteners 18. Although only a single bolt 18 is shown in FIG. 1, a number would be provided arranged around the perimeter of axle tube flange 14.

A caliper bracket/bearing carrier unit is provided as generally designated by reference number 22. Caliper bracket 22 is shown partially cut-away but would include conventional features for mounting a disk brake caliper unit (not shown). Although caliper bracket 22 is provided for mounting elements of a disk brake, this invention could be also implemented in rear drum brake applications, in which case caliper bracket 22 would be replaced by a drum brake backing plate. Caliper bracket 22 is fastened to axle tube flange 14 by tightening nuts 20 on bolts 18 as shown in FIG. 1 and defines a precision formed inside diameter 24 which terminates in an inward projecting flange 26. Caliper bracket 22 has a number of bores 28 which provide for passage of bolts 18. Upon tightening of nuts 20, caliper bracket 22 is clamped firmly against axle tube flange 14.

Cartridge bearing assembly 32 is shown in its mounted position in the Figure. Cartridge bearing assembly 32 is a permanently lubricated bearing unit having a tapered roller bearing configuration with an outer race 34, inner race 36, and two sets of tapered rolling elements 38 and 40. Bearing assembly 32 restrains radial loads as well as axial (thrust) loads in either the outboard or inboard directions relative to the vehicle. Outer race 34 closely fits within caliper bracket inside diameter 24 and is clamped between axle tube counter bore 16 and bearing carrier flange 26.

Axle shaft 44 extends inboard to the axle differential 30 and is in driving engagement with gears within the differential so that torque is applied to the drive wheels. The outboard end of axle shaft 44 defines a wheel mounting flange 48 having a series of wheel mounting studs 50 installed therein. Axle shaft 44 further has an accurately machined bearing journal 52 with a radially extending outboard shoulder 54. At the inboard end of bearing journal 52 is a reduced diameter externally threaded shoulder 56. Inboard retention nut 58 is threaded onto axle threaded portion 56 to engage bearing inner race 36. By tightening retaining nut 58 a clamping force is developed against the inboard race 36 by the nut and axle shoulder 54. Since nut 58 is located inboard of bearing assembly 32, the nut is said to provide "inboard retention" for bearing assembly 32. Retention nut 58 can be locked in place through deforming threads or through the use of other anti-rotation means such as keys, cotter pins, etc. A clearance hole 60 is formed in axle shaft wheel mounting flange 48 to provide access to retention nuts 20 which would need to be loosened in order to remove caliper bracket 22 and thus enabling removal of axle shaft 44.

Assembly of rear axle wheel assembly 10 would proceed by pressing cartridge bearing 32 into caliper bracket 22. Axle shaft 44 would then be slip fit assembled or press-fit through bearing inner race 36. Retaining nut 58 would then be threaded onto threaded portion 56 of the axle shaft and torqued to a predetermined load to provide a specified clamping force onto cartridge bearing assembly 32. The assembly including axle shaft 44, cartridge bearing 32 and caliper bracket 22 would then be assembled to the axle tube 12 and nuts 20 would be torqued through clearance hole 60. The rear axle brake rotor could be included as part of the assembly or assembled as a loose component onto axle flange 48 thereafter.

While the above description constitutes the preferred embodiments of the present invention it will be appreciated that the invention is susceptible of modification, variation and change without departing from the proper scope and fair meaning of the accompanying claims.

I claim:

1. An axle assembly for a motor vehicle of the type having a rigid drive axle shaft extending outboard from a differential to a wheel end and incorporating a cartridge bearing assembly having inner and outer races, said axle assembly comprising:

a hollow axle tube extending outboard from said differential and defining an axle tube flange and an outboard facing bearing assembly retention surface, a bearing carrier having an inside diameter bearing retention surface and an inward projecting flange adapted to engage said bearing outer race, said bearing carrier adapted to be fastened to said axle tube flange, said axle tube bearing retention surface and said bearing carrier flange cooperating to retain said bearing outer race, said axle shaft having a wheel mounting flange and a cylindrical bearing journal adjacent said wheel mounting flange and forming a radially extending shoulder at the outboard end of said cylindrical bearing journal surface, and retention means carried by said axle shaft for clamping said bearing inner race against said axle shaft shoulder.

2. The axle assembly according to claim 1 wherein said retention means exerts an outboard retention force on said bearing inner race.

3. The axle assembly according to claim 2 wherein said retention means carried by said axle shaft for clamping said bearing inner race against said axle shaft shoulder comprises external threads formed on said axle shafts and a threaded nut which meshes with said threads and acts upon said bearing inner race.

4. The axle assembly according to claim 1 wherein said bearing carrier is fastened to said axle tube flange using a plurality of threaded nut and bolt fasteners.

5. The axle assembly according to claim 4 wherein said bolt fastener is press-fit within bores formed by said axle tube flange.

6. The axle assembly according to claim 4 wherein said axle shaft wheel mounting flange features at least one access hole permitting the access of said fastener.

7. An axle assembly for a motor vehicle of the type having a rigid drive shaft extending outboard from a differential to a wheel end and incorporating a cartridge bearing assembly having inner and outer races, said axle assembly comprising:

a hollow axle tube extending outboard from said differential and defining a radially extending axle tube flange and an outboard facing bearing assembly retention surface, a bearing carrier having an inside diameter cylindrical bearing retention surface and an inward projecting flange adapted to engage said bearing outer race, said bearing carrier adapted to be fastened to said axle tube flange, said axle tube bearing retention surface and said bearing carrier flange cooperating to restrain said bearing outer race, said axle shaft having a wheel mounting flange and a cylindrical bearing journal adjacent said wheel mounting flange and forming a radially extending shoulder at the outboard end of said cylindrical bearing journal surface, said axle shaft further having a threaded portion adjacent the inboard end of said bearing journal surface, and a retention nut adapted to be threaded onto said axle shaft threaded portion for cooperating with said axle shaft shoulder to clamp and restrain said bearing inner race.

8. The axle assembly according to claim 7 wherein said bearing carrier is fastened to said axle tube flange using a plurality of threaded nut and bolt fasteners.

9. The axle assembly according to claim 8 wherein said bolt fastener is press-fit within bores formed by said axle tube flange.

10. The axle assembly according to claim 8 wherein said axle shaft wheel mounting flange features at least one access hole permitting access of said fastener.

* * * * *